United States Patent
Li (10) Patent No.: US 12,069,404 B2
(45) Date of Patent: Aug. 20, 2024

(54) VIDEO RECORDING METHOD AND SYSTEM THEREOF

(71) Applicant: ASUSTEK COMPUTER INC., Taipei (TW)

(72) Inventor: Chieh Li, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 168 days.

(21) Appl. No.: 17/961,931

(22) Filed: Oct. 7, 2022

(65) Prior Publication Data

US 2023/0283745 A1  Sep. 7, 2023

(30) Foreign Application Priority Data

Mar. 4, 2022 (TW) .................................. 111108092

(51) Int. Cl.
*H04N 5/907* (2006.01)
*G06F 11/30* (2006.01)

(52) U.S. Cl.
CPC ......... *H04N 5/907* (2013.01); *G06F 11/3058* (2013.01)

(58) Field of Classification Search
CPC ...... A63F 13/63; A63F 13/215; A63F 13/424; A63F 13/214; H04N 21/4424; H04N 21/44008; H04N 21/8549; H04N 21/47205; H04N 21/4334; H04N 5/907; G11B 27/031; G06F 11/3058
USPC .................................................... 348/231.99
See application file for complete search history.

(56) References Cited

U.S. PATENT DOCUMENTS

| | | | |
|---|---|---|---|
| 6,278,497 B1* | 8/2001 | Sumiyoshi | G11B 27/28 348/700 |
| 9,684,787 B2* | 6/2017 | Sridhara | G06F 9/4893 |
| 9,928,880 B2* | 3/2018 | Michihata | H04N 7/181 |
| 10,154,191 B2* | 12/2018 | Gordon | G06F 3/16 |
| 10,290,324 B2* | 5/2019 | Lai | G11B 27/10 |
| 10,359,819 B2* | 7/2019 | Takahashi | H04N 23/63 |
| 11,303,802 B2* | 4/2022 | Takayama | H04N 23/617 |
| 2011/0105857 A1* | 5/2011 | Zhang | H04N 21/44218 600/300 |
| 2015/0286820 A1* | 10/2015 | Sridhara | G06F 1/3206 713/320 |
| 2016/0247543 A1* | 8/2016 | Michihata | H04N 17/002 |
| 2016/0249011 A1* | 8/2016 | Lai | G11B 27/10 |
| 2017/0153792 A1* | 6/2017 | Kapoor | G06F 3/04883 |
| 2017/0168465 A1* | 6/2017 | Chen | G05B 13/0205 |
| 2017/0339338 A1* | 11/2017 | Gordon | G06V 40/20 |

(Continued)

FOREIGN PATENT DOCUMENTS

| | | |
|---|---|---|
| CN | 110314375 A | 10/2019 |
| CN | 111736739 A | 10/2020 |

(Continued)

*Primary Examiner* — Pritham D Prabhakher
(74) *Attorney, Agent, or Firm* — Muncy, Geissler, Olds & Lowe, P.C.

(57) ABSTRACT

A video recording method applied to an electronic device is provided. The electronic device includes a processor configured to execute a program to generate video data. The video recording method includes: monitoring an operating parameter of the processor; setting a first condition; and starting obtaining the video data when the operating parameter meets the first condition. A video recording system is also provided.

9 Claims, 5 Drawing Sheets

(56) References Cited

U.S. PATENT DOCUMENTS

| | | | | |
|---|---|---|---|---|
| 2019/0364221 | A1* | 11/2019 | Jin | H04N 23/651 |
| 2020/0264727 | A1* | 8/2020 | Lee | G06F 3/044 |
| 2020/0314330 | A1* | 10/2020 | Takayama | H04N 23/65 |
| 2021/0368094 | A1* | 11/2021 | Li | G06N 20/00 |

FOREIGN PATENT DOCUMENTS

| | | |
|---|---|---|
| CN | 111773684 A | 10/2020 |
| TW | 201739490 A | 11/2017 |

* cited by examiner

VIDEO RECORDING METHOD AND SYSTEM THEREOF

CROSS-REFERENCE TO RELATED APPLICATION

This application claims the priority benefit of Taiwan application serial No. 111108092, filed on Mar. 4, 2022. The entirety of the above-mentioned patent application is hereby incorporated by reference herein and made a part of the specification.

BACKGROUND OF THE INVENTION

Field of the Invention

The disclosure relates to the field of video processing technologies and, more particularly, to a video recording method and system thereof.

Description of the Related Art

With the rapid development of online games, more and more players like to capture game videos, to review the highlights of the game or share them with other players.

However, when players intend to record the game videos, they have to use a swipe gesture or a key to enable the recording function during the game, which interferes with the game operation of the players and easily causes the players to miss the highlight moments in the game.

BRIEF SUMMARY OF THE INVENTION

The disclosure provides a video recording method applied to an electronic device. The electronic device includes a processor, an obtaining condition setting unit, and a video obtaining unit. The processor is configured to execute a program to generate video data, the obtaining condition setting unit is configured to set a condition, and the video obtaining unit is configured to obtain the video data. The video recording method includes: monitoring an operating parameter of the processor; setting a first condition through the obtaining condition setting unit; and obtaining the video data through the video obtaining unit when the operating parameter meets the first condition.

The disclosure further provides a video recording system applied to an electronic device. The electronic device includes a processor configured to execute a program to generate video data. The video recording system includes a sensor and a video obtaining module. The sensor is configured to monitor an operating parameter of the processor. The video obtaining module includes an obtaining condition setting unit and a video obtaining unit. A first condition is set through the obtaining condition setting unit, and the video data is obtained through the video obtaining unit when the operating parameter meets the first condition.

By using the video recording method and system thereof provided in the disclosure, the video data automatically starts to be obtained according to an operating status of the processor, without requiring a user to manually enable a recording function. In this manner, players are prevented from being interfered with during the game to miss highlight moments in the game.

DETAILED DESCRIPTION OF THE EMBODIMENTS

Figure 1:
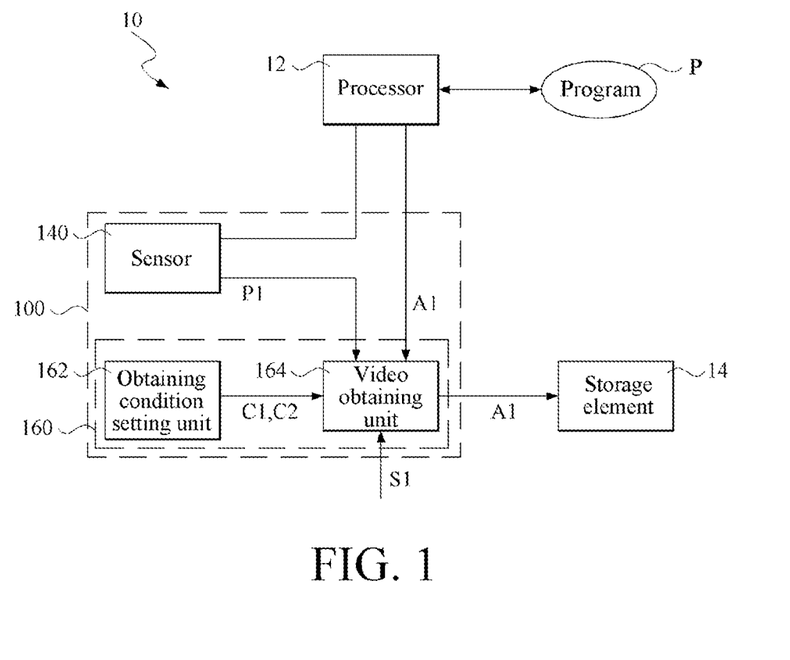
FIG. 1 is a schematic block diagram of a video recording system according to an embodiment of the disclosure.

Referring to FIG. 1, a video recording system 100 according to the disclosure is applied to an electronic device 10, such as a smartphone, a tablet computer, a notebook computer, a handheld game console, or the like. The electronic device 10 includes a processor 12 and a storage element 14. The processor 12 is configured to execute a program P to generate video data A1.

In an embodiment, the program P is a game program, and the video data A1 is game video data generated during an execution progress of the game program.

In an embodiment, the processor 12 is a central processing unit (CPU) or a graphics processing unit (GPU). The storage element 14 is configured to store the video data A1 obtained by the video recording system 100. The storage element 14 is a random access memory (RAM), a solid-state drive, or the like.

As shown in the figure, the video recording system 100 includes a sensor 140 and a video obtaining module 160.

The sensor 140 is configured to monitor an operating parameter P1 of the processor 12. In an embodiment, the sensor 140 is a sensing element on a mainboard, and is configured to detect data such as an operating temperature, operating frequency or operating voltage of the CPU. The operating parameter P1 is an operating temperature, operating frequency or operating voltage of the processor 12, or an operating temperature, operating frequency or operating voltage of a specific core in a multi-core processor.

The video obtaining module 160 includes an obtaining condition setting unit 162 and a video obtaining unit 164. The obtaining condition setting unit 162 is configured to set a first condition C1 and a second condition C2.

In an embodiment, the obtaining condition setting unit 162 sets the corresponding first condition C1 and second condition C2 according to a type of the program P. In an embodiment, the obtaining condition setting unit 162 provides an interface for a user to adjust the first condition C1 and the second condition C2.

The video obtaining unit 164 of the video obtaining module 160 starts obtaining the video data A1 when the operating parameter P1 meets the first condition C1, and stops obtaining the video data A1 when the operating parameter P1 meets the second condition C2.

In an embodiment, the video obtaining unit 164 alternatively stops obtaining videos according to a stop signal S1. The stop signal S1 comes from a swipe gesture or a key signal.

In an embodiment, the video obtaining module 160 first determines whether the electronic device 10 executes the program P. After it is determined that the electronic device 10 executes the program P, the video obtaining unit 164 sets the first condition C1 and the second condition C2 according to the program P.

In an embodiment, the video obtaining module 160 includes a software program, which is executed by the processor 12 to set the first condition C1 and the second condition C2, and to obtain the video data A1. In an embodiment, the software program is stored in the storage element 14.

When the operating parameter P1 is the operating temperature of the processor 12, the first condition C1 is set as that the operating temperature is higher than a preset temperature. The video obtaining unit 164 starts obtaining the video data A1 when the operating temperature of the processor 12 is higher than the preset temperature. The second condition C2 is set as that the operating temperature is lower than a preset temperature. The video obtaining unit 164 stops obtaining the video data A1 when the operating temperature of the processor 12 is lower than the preset temperature.

When the operating parameter P1 is the operating frequency of the processor 12, the first condition C1 is set as that the operating frequency is higher than a preset frequency. The video obtaining unit 164 starts obtaining the video data A1 when the operating frequency of the processor 12 is higher than the preset frequency.

The second condition C2 is set as that the operating frequency is lower than a preset frequency. The video obtaining unit 164 stops obtaining the video data A1 when the operating frequency of the processor 12 is lower than the preset frequency. The preset temperature or preset condition set by the foregoing first condition C1 is the same as the preset temperature or preset condition set by the second condition C2, or is different from the preset temperature or preset condition set by the second condition C2.

When the operating parameter P1 is operating temperatures of a plurality of cores in the multi-core processor, such as operating temperatures of a big core and a little core, the first condition C1 is set as that the operating temperature of the big core is higher than a first preset temperature and the operating temperature of the little core is higher than a second preset temperature. The second condition C2 is set as that the operating temperature of the big core is lower than the first preset temperature and the operating temperature of the little core is lower than the second preset temperature. The foregoing first preset temperature and second preset temperature are set to different values.

In an embodiment, cores targeted by the first condition C1 and the second condition C2 are different. In an embodiment, the first condition C1 is set as that the operating temperatures of the plurality of cores are higher than the preset temperature, and the second condition C2 is set as that an operating temperature of one of the plurality of cores is lower than the preset temperature.

When the operating parameter P1 is the operating frequencies of a plurality of cores in the multi-core processor, such as operating frequencies of a large core and a small core, the first condition C1 is set as that the operating frequency of the large core is higher than a first preset frequency and the operating frequency of the small core is higher than a second preset frequency, and the second condition C2 is set as that the operating frequency of the large core is lower than the first preset frequency and the operating frequency of the small core is lower than the second preset frequency. The foregoing first preset frequency and second preset frequency are set to different values.

In an embodiment, cores targeted by the first condition C1 and the second condition C2 are different. In an embodiment, the first condition C1 is set as that the operating frequencies of the plurality of cores are higher than a preset frequency, and the second condition C2 is set as that an operating frequency of one of the plurality of cores is lower than the preset frequency.

The video data A1 obtained by the video obtaining unit 164 of the video obtaining module 160 is stored in the storage element 14 or is shared with other players through network uploading.

Generally, load of the processor 12 increases rapidly when the electronic device 10 executes a program P with a large number of special effects or a scene with a large number of special effects appears on a screen. Moreover, the operating temperature and operating frequency of the processor 12 also increase in response to the increasing load. The video recording system 100 of the disclosure automatically obtains the video data A1 in response to the increasing load of the processor 12, without requiring the user to manually enable the recording function.

Figure 2:
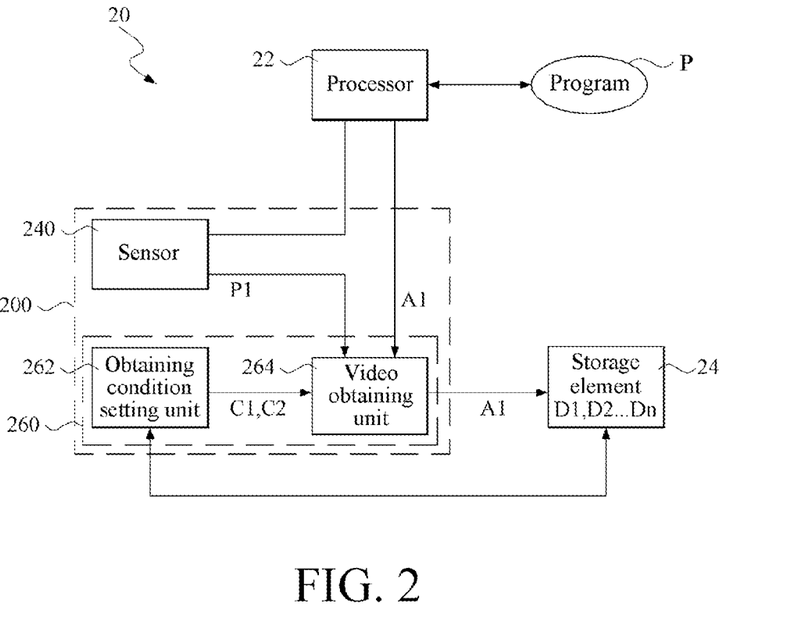
FIG. 2 is a schematic block diagram of a video recording system according to another embodiment of the disclosure.

Referring to FIG. 2, a video recording system 200 according to the disclosure is applied to an electronic device 20. The electronic device 20 includes a processor 22 and a storage element 24.

The processor 22 is configured to execute a program P to generate video data A1. The processor 22 is a CPU or a GPU. The storage element 24 stores a plurality of preset conditions D1, D2, . . . , Dn corresponding to a plurality of preset programs. The storage element 24 is a random access memory (RAM), or a solid-state drive.

As shown in the figure, the video recording system 200 includes a sensor 240 and a video obtaining module 260.

The processor 22 is configured to execute a program P to generate video data A1. The processor 22 is a CPU or a GPU.

The sensor 240 is configured to monitor an operating parameter P1 of the processor 22. In an embodiment, the sensor 240 is a sensing element on a mainboard, and is configured to detect data such as an operating temperature, operating frequency or operating voltage of the CPU. The foregoing operating parameter P1 is an operating temperature, operating frequency or operating voltage of the processor, or an operating temperature, operating frequency or operating voltage of a specific core in a multi-core processor.

The video obtaining module 260 includes an obtaining condition setting unit 262 and a video obtaining unit 264. The obtaining condition setting unit 262 captures preset conditions corresponding to the executed program P from the storage element 24 according to the program P as the first condition C1 and the second condition. The video obtaining unit 264 starts obtaining the video data A1 when the operating parameter P1 meets the first condition C1, and the video obtaining unit 264 stops obtaining the video data A1 when the operating parameter P1 meets the second condition C2.

Compared with the video recording system 100 provided in FIG. 1, the video recording system 200 provided in this embodiment sets different preset conditions for different programs P and stores the preset conditions in the storage element 24, so as to respond to load difference caused by various different programs P on the processor 22, and ensure that the video recording system 200 in the disclosure is applied to different programs P.

Figure 3:
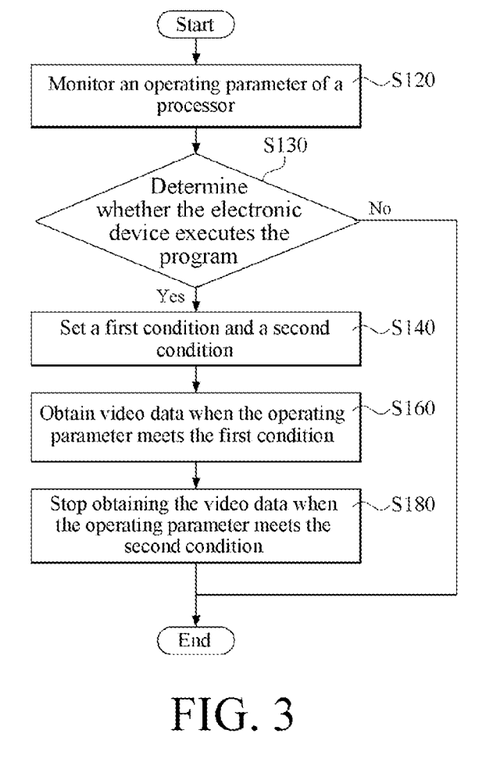
FIG. 3 is a flowchart of a video recording method according to an embodiment of the disclosure.

Referring to FIG. 3, the video recording method according to the disclosure is applied to an electronic device, such as the electronic device 10 in FIG. 1, and includes the following steps.

First, as described in step S120, an operating parameter P1 of the processor 12 is monitored. An object monitored in step S120 is a CPU or a GPU. A monitored operating parameter P1 is the operating temperature, operating frequency or operating voltage of the processor 12. Referring to FIG. 1, step S120 is performed by the sensor 140.

Then, as described in step S130, it is determined whether the electronic device 10 executes the program P. When the electronic device 10 executes the program P, the process proceeds to step S140, and when the electronic device 10 doesn't execute the program P, the process ends. Referring to FIG. 1, step S130 is performed by the video obtaining module 160.

Next, as described in step S140, a first condition C1 and a second condition C2 are set. In an embodiment, the corresponding first condition C1 and second condition C2 are set according to a type of the program P in step S140. Referring to FIG. 1, step S140 is performed by the video obtaining module 160.

When the operating parameter P1 is the operating temperature of the processor 12, the first condition C1 is set as that the operating temperature is higher than a preset temperature, and the second condition C2 is set as that the operating temperature is lower than a preset temperature. When the operating parameter P1 is the operating frequency of the processor 12, the first condition C1 is set as that the operating frequency is higher than a preset frequency, and the second condition C2 is set as that the operating frequency is lower than a preset frequency. The preset temperature or preset condition set by the first condition C1 is the same as the preset temperature or preset condition set by the second condition C2, or is different from the preset temperature or preset condition set by the second condition C2.

Next, as described in step S160, the video data A1 starts to be obtained when the operating parameter P1 meets the first condition C1. Referring to FIG. 1, step S160 is performed by the video obtaining module 160.

Next, as described in step S180, the video data A1 is stopped from being obtained when the operating parameter P1 meets the second condition C2. Referring to FIG. 1, step S180 is performed by the video obtaining module 160.

In the video recording method according to this embodiment, the video data A1 is automatically obtained in response to the increasing load of the processor 12, without requiring the user to manually enable the recording function. In addition, the video recording method according to this embodiment includes step S130 of determining whether the program P is executed or not, thereby avoiding enabling the video recording function in a case that other heavy-load programs (such as a drawing program) other than the program P are executed, causing a malfunction.

Figure 4:
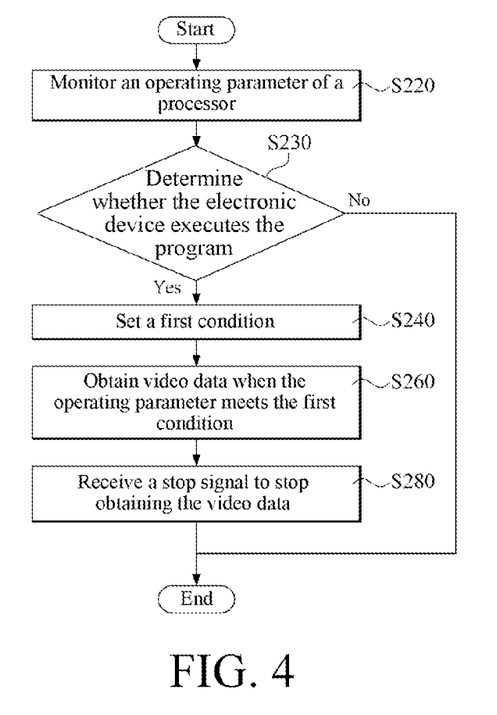
FIG. 4 is a flowchart of a video recording method according to another embodiment of the disclosure.

FIG. 4 is a flowchart of a video recording method according to another embodiment of the disclosure. The video recording method is applied to an electronic device, such as the electronic device 10 in FIG. 1.

A main difference between the video recording method of this embodiment and the embodiment of FIG. 3 is that only the first condition C1 is set in step S240 of the video recording method according to this embodiment, while the second condition C2 is not set. In step S280, a stop signal S1 is received to stop obtaining the video data A1, different from step S180 in FIG. 3, in which stopping obtaining the video data A1 is determined according to the second condition C2. The stop signal S1 received in step S280 comes from a swipe gesture or a key signal. Other steps in this embodiment, such as steps S220, S230, and S260 are the same as steps S120, S130, and S160 in FIG. 3. Details are not described herein.

Figure 5:
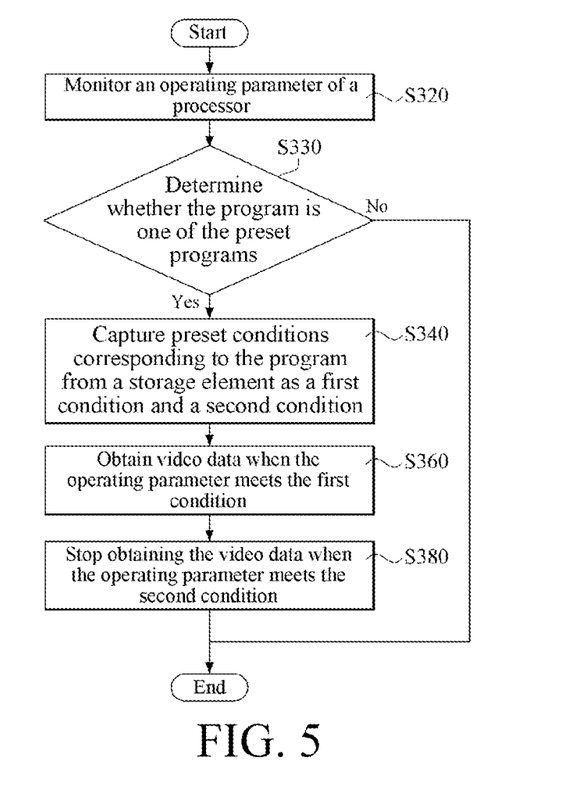
FIG. 5 is a flowchart of a video recording method according to still another embodiment of the disclosure.

Referring to FIG. 5, the electronic device 20 executes a program P. The storage element 24 thereof stores a plurality of preset conditions D1, D2, . . . , Dn corresponding to a plurality of preset programs. The video recording method includes the following steps.

First, as described in step S320, an operating parameter P1 of the processor 22 is monitored. An object monitored in step S320 is a CPU or a GPU. A monitored operating parameter P1 is the operating temperature, operating frequency or operating voltage of the processor 22. Referring to FIG. 2, step S320 is performed by the sensor.

Then, as described in step S330, it is determined whether the program P is one of the preset programs. When the program P is one of the preset programs, the process proceeds to step S340, and preset conditions corresponding to the program P are captured from the storage element 24 as the first condition C1 and the second condition C2. When the program P isn't one of the preset programs, the process ends and the video recording function is not enabled. Referring to FIG. 2, the foregoing steps S330 and S340 are performed by the video obtaining module 260.

Next, as described in step S360, the video data A1 starts to be obtained when the operating parameter P1 meets the first condition C1. Referring to FIG. 2, step S360 is performed by the video obtaining module 260.

Next, as described in step S380, the video data A1 is stopped from being obtained when the operating parameter P1 meets the second condition C2. Referring to FIG. 2, step S380 is performed by the video obtaining module 260.

Compared with the video recording method provided in FIG. 3, in the video recording method provided in this embodiment, a plurality of preset conditions D1, D2, . . . , Dn corresponding to different preset programs is preset, and after the program P is executed, corresponding preset conditions are selected from these preset conditions D1, D2, . . . , Dn as the first condition C1 and the second condition C2 to obtain the video data A1 for the executed program P. In this manner, appropriate conditions are set in response to load difference of various different programs P on the processor 22 to enable the video recording function, so as to ensure that the video recording method is effectively applied to different programs P.

By using the video recording method and system thereof provided in the disclosure, the video data A1 automatically starts to be obtained according to an operating status of the processor, without requiring a user to manually enable a recording function. In this manner, players are prevented from being interfered with during the game because of enabling a recording function, and missing highlight moments in the game.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A video recording method, applied to an electronic device, wherein the electronic device comprises a processor, an obtaining condition setting unit, and a video obtaining unit, the processor is configured to execute a program to generate video data, the obtaining condition setting unit is configured to set a condition, and the video obtaining unit is configured to obtain the video data, and the video recording method comprises:

monitoring an operating parameter of the processor;

setting a first condition through the obtaining condition setting unit; and     obtaining the video data through the video obtaining unit, when the operating parameter meets the first condition,     wherein the operating parameter is an operating temperature, and the first condition is that the operating temperature is higher than a preset temperature.

2. The video recording method according to claim 1, wherein the operating parameter is an operating frequency, and the first condition is that the operating frequency is higher than a preset frequency.

3. The video recording method according to claim 1, further comprising:

setting a second condition through the obtaining condition setting unit; and     stopping obtaining the video data through the video obtaining unit when the operating parameter meets the second condition.

4. The video recording method according to claim 3, wherein the operating parameter is an operating temperature, and the second condition is that the operating temperature is lower than a preset temperature.

5. The video recording method according to claim 3, wherein the operating parameter is an operating frequency, and the second condition is that the operating frequency is higher than a preset frequency.

6. The video recording method according to claim 1, wherein the electronic device comprises a storage element, and the storage element stores a plurality of preset conditions corresponding to a plurality of preset programs.

7. The video recording method according to claim 6, further comprising:

determining whether the program is one of the preset programs or not, and when the program is one of the preset programs, capturing the preset condition corresponding to the program from the storage element as the first condition.

8. A video recording system applied to an electronic device, wherein the electronic device comprises a processor configured to execute a program to generate video data, and the video recording system comprises:

a sensor, configured to monitor an operating parameter of the processor; and     a video obtaining module, comprising an obtaining condition setting unit and a video obtaining unit, wherein a first condition is set through the obtaining condition setting unit, and the video data is obtained through the video obtaining unit when the operating parameter meets the first condition,     wherein the operating parameter is an operating temperature, and the first condition is that the operating temperature is higher than a preset temperature.

9. The video recording system according to claim 8, wherein the electronic device further comprises a storage element, the storage element stores a plurality of preset conditions corresponding to a plurality of preset programs, and the video obtaining module captures the preset condition corresponding to the program from the storage element as the first condition.

\* \* \* \* \*